United States Patent [19]

Hashimoto et al.

[11] Patent Number: 5,096,943

[45] Date of Patent: Mar. 17, 1992

[54] METHOD FOR INCORPORATING METAL SALTS OF $\alpha,\beta$-ETHYLENICALLY UNSATURATED CARBOXYLIC ACIDS IN POLYMERS

[75] Inventors: Takatsugu Hashimoto, Akron; David M. Roggeman, North Royalton; Arthur E. Oberster, North Canton; Jung W. Kang, Clinton, all of Ohio

[73] Assignees: Bridgestone/Firestone, Inc., Akron, Ohio; Bridgestone Corporation, Tokyo, Japan

[21] Appl. No.: 509,277

[22] Filed: Apr. 16, 1990

[51] Int. Cl.$^5$ .............................. C08K 5/09; C08L 9/00
[52] U.S. Cl. ..................................... 523/333; 524/176; 524/571; 524/599; 524/781; 524/783; 524/785; 525/274
[58] Field of Search .............. 525/274; 523/333; 524/176, 571, 599, 781, 783, 785

[56] References Cited

U.S. PATENT DOCUMENTS

| | | | |
|---|---|---|---|
| 3,823,122 | 7/1974 | Schuh et al. | 260/85.1 |
| 4,056,269 | 11/1977 | Pollitt et al. | 273/218 |
| 4,065,537 | 12/1977 | Miller et al. | 264/143 |
| 4,082,288 | 4/1978 | Martin et al. | 273/218 |
| 4,141,559 | 2/1979 | Melvin et al. | 273/220 |
| 4,191,671 | 3/1980 | Kataoka et al. | 260/23.7 |
| 4,192,790 | 3/1980 | McKinstry et al. | 260/31.2 |
| 4,266,772 | 5/1981 | Martin et al. | 273/218 |
| 4,495,326 | 1/1985 | Donatelli et al. | 524/533 |
| 4,500,466 | 2/1985 | Hayes et al. | 260/429 |
| 4,529,770 | 7/1985 | Hayes et al. | 524/445 |
| 4,546,980 | 10/1985 | Gendreau et al. | 273/218 |
| 4,616,048 | 10/1986 | De Trano et al. | 524/110 |
| 4,688,801 | 8/1987 | Reiter | 273/218 |
| 4,713,409 | 12/1987 | Hayes et al. | 525/274 |
| 4,715,607 | 12/1987 | Llort et al. | 273/218 |
| 4,720,526 | 1/1988 | Roland | 525/281 |
| 4,726,590 | 2/1988 | Molitor | 273/220 |
| 4,770,422 | 9/1988 | Isaac | 273/218 |
| 4,929,678 | 5/1990 | Hamada et al. | 525/193 |
| 4,955,613 | 9/1990 | Gendreau et al. | 273/218 |
| 4,971,329 | 11/1990 | Llort et al. | 273/218 |
| 4,974,852 | 12/1990 | Hiraoka et al. | 273/218 |
| 4,990,570 | 2/1991 | Saito et al. | 525/254 |

FOREIGN PATENT DOCUMENTS 63-223048  9/1988  Japan.

*Primary Examiner*—Joseph L. Schofer
*Assistant Examiner*—Tom Weber
*Attorney, Agent, or Firm*—Frank J. Troy, Sr.

[57] ABSTRACT

A method for incorporating metal salts of $\alpha,\beta$-ethylenically unsaturated carboxylic acids into polymers and improving the cured physical properties of vulcanizable rubber compositions based on such polymers. The method includes the steps of preparing a polymer cement in a suitable organic solvent, forming a suspension of the metal salt of an $\alpha,\beta$-ethylenically unsaturated carboxylic acid in a suitable aliphatic hydrocarbon solvent miscible with the organic solvent, mixing the polymer cement and the suspension together and thereafter removing the solvents to provide the metal salt uniformly dispersed within the polymer.

6 Claims, No Drawings

METHOD FOR INCORPORATING METAL SALTS OF α,β-ETHYLENICALLY UNSATURATED CARBOXYLIC ACIDS IN POLYMERS

TECHNICAL FIELD

The present invention relates to a method for incorporating metal salts of α,β-ethylenically unsaturated carboxylic acids into various rubber compositions. Such metal salts have been added to rubber compositions heretofore in order to improve certain physical properties of the rubber such as tensile strength, modulus and percent elongation. Nonetheless, because it is difficult, if not impossible, to obtain a good dispersion of the salts within the rubber during compounding, optimum improvements in cured physical properties have not been obtained.

BACKGROUND OF THE INVENTION

The addition of metal salts of α,β-ethylenically unsaturated carboxylic acids to rubber compounds is known. U.S. Pat. No. 4,082,288, for instance, discloses a method for making molding compositions useful for manufacturing golf balls which includes the step of mixing a zinc oxide-methacrylic acid reaction product with a free-radical crosslinkable elastomer.

U.S. Pat. No. 4,191,671 is directed toward abrasion resistant rubber compositions having improved flexing fatigue resistance which are prepared by heating and curing a mixture comprising a diene elastomer, an unpolymerizable carboxylic acid or metal salt thereof, an α,β-ethylenically unsaturated carboxylic acid, a divalent metal compound and an organic peroxide.

U.S. Pat. No. 4,501,866 provides a continuous polymerization process for preparing high cis-1,4 polybutadiene including the steps of continuously feeding 1,3-butadiene in a hydrocarbon solvent to a reaction with a preformed π allyl catalyst formed by mixing a carboxylated metal oxy borate compound with nickel or cobalt, an organoaluminum compound, an alcohol, a small amount of 1,3-butadiene and a hydrocarbon solvent and, a cocatalyst comprising a boron trifluoride complex with an alcohol.

U.S. Pat. No. 4,529,770 provides vulcanizable rubber compositions comprising a rubbery polymer, from about 2.5 to 20 parts by weight of zinc dimethacrylate and about 30 to 70 parts by weight of a filler.

U.S. Pat. No. 4,720,526 is directed toward a method of preparing cured rubber compositions having improved modulus properties. The method includes the steps of adding a metal methacrylate and a peroxide curing agent to a rubbery polymer and then curing the mixture.

Finally, Japanese Patent No. 63-223048 is directed toward a process which involves mixing rubber, a metal oxide, hydroxide or carbonate, acrylic acid and a solvent for the rubber. In this manner a rubber crosslinking agent, e.g., zinc diacrylate, is formed that is free from dust. Improved physical properties are imparted to the rubber products.

Despite the widespread use of such metal salts in rubber polymer compounds the art has not provided a satisfactory method heretofore, for the uniform distribution of the metal salt throughout the polymer.

DISCLOSURE OF THE INVENTION

It is, therefore, an object of the present invention to provide a method for the uniform incorporation of metal salts of α,β-ethylenically unsaturated carboxylic acids into rubbery polymers.

It is another object of the present invention to improve the cured properties of vulcanizable rubber compounds by preparing a suspension of a metal salts of an α,β-ethylenically unsaturated carboxylic acid and adding it to a polymer cement.

It is still another object of the present invention to provide a method for the uniform incorporation of metal salts of α,β-ethylenically unsaturated carboxylic acids into rubbery polymers which eliminates separate steps of solvent recovery.

In general, the method of the present invention includes the steps of preparing a polymer cement in a suitable organic solvent, forming a suspension of the metal salt of an α,β-ethylenically unsaturated carboxylic acid in a suitable aliphatic hydrocarbon solvent miscible with the organic solvent, and mixing the cement and the suspension together and thereafter removing said solvents to provide the metal salt uniformly dispersed within the polymer.

These and other objects which shall become apparent to those skilled in the art are described in greater detail with reference to the specification which follows.

PREFERRED EMBODIMENT FOR CARRYING OUT THE INVENTION

As noted hereinabove, the known technique of incorporating metal salts of α,β-ethylenically unsaturated carboxylic acids into rubber is by dry mixing of the metal salts with the rubber, which does not provide a very uniform dispersion of the salt throughout the rubber. The method of the present invention overcomes that disadvantage by employing a solution masterbatch technique in which a polymer cement is mixed with a compatible suspension of a metal carboxylic acid salt. Rubbers or rubbery polymers which may be employed in the compositions of the invention include synthetic rubber such as nitrile rubber, neoprene, diene rubbers, ethylene propylene rubber (EPR), ethylene propylene diene rubber (EPDR), copolymers of a conjugated diene and at least one monoolefin and blends thereof.

The copolymers of conjugated dienes may be derived from conjugated dienes such as 1,3-butadiene, 2-methyl-1,3-butadiene(isoprene), 2,3-dimethyl-1,3-butadiene, 1,3-pentadiene, 1,3-hexadiene and the like, as well as mixtures of the foregoing dienes. The preferred conjugated diene is 1,3-butadiene.

The copolymers may be derived from various monoolefinic monomers including vinyl aromatic monomers such as styrene, alpha-methyl styrene, vinyl naphthalene, vinyl pyridine and the like; alkyl acrylates or methacrylates such as methyl acrylate, ethyl acrylate, butyl acrylate, methyl methacrylate, butyl methacrylate and the like; unsaturated nitriles such as acrylonitrile, methacrylonitrile and the like and vinyl halides such as vinyl chloride, vinylidene chloride and the like as well as mixtures of the foregoing monoolefins. The copolymers may contain up to 50 percent by weight of the monoolefin based upon the total weight of copolymer. The preferred copolymer is a copolymer of a conjugated diene, especially butadiene, and a vinyl aromatic hydrocarbon, especially styrene made by solution polymerization techniques.

The above-described copolymers of conjugated dienes and their method of preparation are well known in the rubber and polymer arts. Many of the polymers and copolymers are commercially available.

The metal salts are derived from the reaction of a metal selected from the group consisting of zinc, iron (II) and copper (II), as well as alkaline earth metals such as magnesium and calcium and an $\alpha,\beta$-ethylenically unsaturated carboxylic acid having from about 3 to 30 carbon atoms, preferably acrylic acid or methacrylic acid. Particularly preferred is zinc dimethacrylate and magnesium dimethacrylate.

The zinc dimethacrylate and magnesium dimethacrylate may be prepared by any known method. In general, the zinc dimethacrylate may be prepared by reacting with agitation zinc oxide and methacrylic acid in an amount of from about 0.5 to about 0.6 moles of zinc oxide per mole of methacrylic acid in a liquid medium, e.g., water or a volatile organic liquid such as a liquid hydrocarbon, recovering the resulting zinc dimethacrylate product from the liquid medium and then drying the product. The magnesium dimethacrylate can be prepared in similar manner by reacting magnesium hydroxide, magnesium oxide and methacrylic acid in an amount of from about 0.5 to about 0.6 moles of magnesium hydroxide or magnesium oxide per mole of methacrylic acid in the liquid medium. If desired, the zinc dimethacrylate and magnesium dimethacrylate may be finely divided to aid in dispersing the materials into the rubber.

A preferred method for preparing the zinc dimethacrylate is described in U.S. Pat. No. 4,500,466 to Hayes et al, the disclosure of which is incorporated herein by reference. The method involves reacting with agitation zinc oxide and methacrylic acid in amounts of from about 0.5 to about 0.6 moles of zinc oxide per mole of methacrylic acid in a liquid aliphatic hydrocarbon, preferably an alkane, especially hexane, followed by recovery of the resultant zinc dimethacrylate from the liquid medium and drying thereof.

Practice of the method of the present invention for incorporating metal salts of $\alpha,\beta$-ethylenically unsaturated carboxylic acids into rubbery polymers requires that a solution of the polymer be prepared in an appropriate aliphatic hydrocarbon solvent, such as hexane, heptane and the like, to form a rubber cement. The solution contains from about 14 to 25 percent by weight of polymer, with 25 percent by weight preferred. To this solution is added a suspension of the metal carboxylic acid salt in an organic solvent, the same as or compatible with the rubber polymer solvent. The suspension contains from about 10 to 50 percent by weight of metal salt, with 30 percent by weight preferred. Thus, the metal salts are satisfactorily dispersed within the rubbery polymer without the use of processing aids such as fatty acids which are often necessary in dry mixing techniques.

The polymer cement and solution masterbatch containing the $\alpha,\beta$-ethylenically unsaturated carboxylic acid metal salt can be used immediately or stored for subsequent combination. Another advantage of the present invention is that the solvent utilized to prepare the polymer is not removed at this stage, thereby saving the time and cost otherwise expended for a separate recovery of the polymer. Conventionally, the solvent is removed from the polymer when the latter is recovered and solvent must also be removed following preparation of the metal salt e.g., zinc dimethacrylate. The two components are then continued by milling or similar technique. The method of the present invention involves the combination of two solutions, with only one solvent removal.

When desired, the solution and suspension are then stirred together vigorously for at least 30 minutes to about 100 hours at 25° to 100° C. under a nitrogen atmosphere. The solvents are then removed by one of several conventional methods, e.g., drum drying, extrusion, evaporation, air drying or the like to yield a dispersion of the metal salt in the polymer. Preferred removal of solvents is by drum drying or extrusion methods. The method can be practiced in a batch or a continuous manner, as exemplified hereinbelow.

The amount of metal carboxylic acid salt employed to form the vulcanizable rubber compositions can range from about 2 to 98 parts by weight and the amount of rubber can range from about 98 to 2 parts by weight, to total 100 parts by weight. The relative amounts of rubber cement and metal salt suspension can be varied depending upon the concentration of each, and the overall desired composition of the vulcanizable rubber compound.

The polymer compounds resulting from practice of the present invention are cured with peroxides. Peroxide curing agents which may be used in the compositions include organic peroxides such as dicumyl peroxide, bis-(t-butyl peroxy)diiospropyl benzene, t-butyl perbenzoate, di-t-butyl peroxide, 2,5-dimethyl-2,5-di-t-butyl peroxide-hexane and the like. The preferred peroxide curing agents are bis-(t-butyl peroxy)-diisopropyl benzene and dicumyl peroxide.

Amounts of peroxide curing agents included in the compositions will depend upon the type of rubber utilized and may broadly be stated as cure effective amounts. In general, such amounts may range from about 0.2 to about 10 parts by weight per 100 parts by weight of the vulcanizable rubber composition or product.

The compositions may optionally contain other additives commonly utilized in rubber compositions such as process and extender oils, antioxidants, waxes and the like. Additionally, fillers or mixtures of fillers can be used in amounts of from about 30 to about 70 parts by weight per 100 parts by weight of product.

In order to demonstrate practice of the present invention, a polymer cement was prepared in a batch process, as Example 1, and a continuous process, as Example 2. A zinc methacrylate powder, prepared as in the aforementioned U.S. Pat. No. 4,500,466 was used to prepare a suspension in hexane, Example 3. In Examples 4 and 5, the suspension of Example 3 was added to the polymer cements of Examples 1 and 2, respectively.

EXAMPLE NO. 1

In this example, a 7.6 liter stainless steel reactor was fitted with a thermometer, stirrer, inlet and outlet port and a nitrogen atmosphere was provided. A 4536 gram blend containing 1097.7 grams of 1,3-butadiene in hexane was charged followed by a preformed catalyst. The catalyst was prepared as a two part system as follows.

Part I

Into a 828 cc crown capped beverage bottle were charged the following ingredients in sequential order.
1) 18.4 ml of tri-isobutylaluminum in hexane (18%, 11.2 mmole)
2) 85 grams of 1,3-butadiene/hexane blend containing 20 grams of monomer 3) 0.56 grams of nickel boroacylate (NiOB) in hexane (0.09 moles)

Part II

A borotrifluoride/n-hexanol complex was formed by combining 11.2 mmoles of boron trifluoride and 22.4 mmoles of n-hexanol (2:1 ratio of n-hexanol (BF$_3$).

Parts I and II of the resultant preformed catalyst were then charged to the above reactor at room temperature. The polymerization was then allowed to proceed for 60 minutes at 90° to 100° C. The resulting polymer cement (>95 percent conversion) was then dropped into 3500 ml of hexane containing an amine stopping agent, such as one of the aliphatic diamines, and a non-staining antioxidant, such as one of the hindered phenols. Typical properties of the polymer prepared by the above batch process were as follows:

| | |
|---|---|
| ML/4/100° C. | 41.0 |
| DSV | 2.29 |
| [μ] THF | 2.59 |
| Microstructure by Infrared | |
| Cis-1,4 | 96.4% |
| Trans-1,4 | 2.40% |
| Vinyl | 1.2% |

EXAMPLE NO. 2

A polymerization was conducted in a 24.6 liter continuously stirred tank reactor under adiabatic conditions. A purified 1,3-butadiene/hexane blend containing 26 percent by weight of 1,3-butadiene was metered continuously into the reactor. The preformed catalyst components (Part I and Part II) were metered separately and continuously into the reactor. The polymerization was carried out at ≧102° C. with a 45 to 60 minute residence time. The polymer cement was collected in a separate reactor and terminated with an amine-type stopping agent, and a non-staining antioxidant was added. Five samples, 2A-2E, were prepared as reported in Table I which presents polymerization charges, conditions and properties.

TABLE I

Continuous Polybutadiene Cement Preparation

| | Example No. | | | | |
|---|---|---|---|---|---|
| | 2A | 2B | 2C | 2D | 2E |
| Bd. Wt. % | 22.0 | 22.4 | 22.6 | 23.6 | 23.6 |
| NiOB,[a] mM phgm | 0.074 | 0.076 | 0.073 | 0.072 | 0.069 |
| Ratio of Catalyst Components | | | | | |
| Al/Ni | 11:1 | 10:1 | 9:1 | 10:1 | 9:1 |
| B/Ni | 11:1 | 10:1 | 10:1 | 10:1 | 9:1 |
| Polymerization Conditions | | | | | |
| Temp. °C., Top of Reactor | 103 | 108 | 108 | 105 | 108 |
| Residence Time (min.) | 60 | 45 | 45 | 45 | 45 |
| % Conversion | 88.2 | 88.0 | 88.2 | 89.6 | 91.3 |
| Physical Properties | | | | | |
| ML$_{1+4}$ @ 100° C. | 50.0 | 55.0 | 55.0 | 52.0 | 51.0 |
| DSV | 2.28 | 2.36 | 2.42 | 2.34 | 2.33 |
| % Gel | 7.3 | 7.8 | 4.6 | 3.8 | 4.3 |
| Microstructure | | | | | |
| % Cis-1,4 | 95.6 | 95.8 | 95.9 | 95.8 | 95.4 |
| % Trans-1,4 | 2.8 | 2.8 | 2.8 | 2.8 | 3.2 |
| % Vinyl | 1.6 | 1.4 | 1.3 | 1.4 | 1.4 |

[a]Nickel boroacylate

EXAMPLE NO. 3

The preparation of the zinc methacrylate/hexane suspension was conducted in a 378 liter stainless steel reactor equipped with a thermometer, a stirrer, and an inlet and outlet port. The reactor was maintained under a nitrogen atmosphere during and after the reaction. To the above described reactor was added in sequence 82.8 liters of hexane, 15 ml each of Triton X-15, Triton X-45 and Triton X-100 surfactants, 4.5 kilograms of zinc oxide and finally, 9.2 kilograms of methacrylic acid. The Triton components are nonionic octylphenoxy polyethoxy ethanol surfactants available from Rohm & Hass Company. These reactants were all added at room temperature. Following a slight exotherm, the reaction mixture was stirred vigorously at ambient temperature for 24 hours. The resulting suspension of zinc methacrylate in hexane was used directly in the suspension masterbatch preparations which follow, Examples 4 and 5.

EXAMPLE NO. 4

To an 18.9 liter reactor fitted with a stirrer and an addition port was charged 3629 grams of the polymer cement from Example 1 (13% total solids or 472 grams of polymer). A suspension of zinc methacrylate in hexane (396 grams in 2000 ml of hexane) as prepared in Example 3 was then charged slowly into the polymer cement with vigorous stirring, under a nitrogen atmosphere and at room temperature over a period of 15 minutes. After addition was complete, the reaction mixture was stirred an additional 30 minutes. The resulting white viscous product containing the polymer and zinc methacrylate was checked for average particle size using a "fineness of grind gauge" and had an average particle size of less than 10 microns. The solvent (hexane) was then removed to yield the masterbatch. Removal can be accomplished in one of several ways including drum drying at 120° or 145° C., air drying at room temperature, or extruder drying.

EXAMPLE NO. 5

In this example, 13.6 kilograms of polymer cement (Example No. 2A in Table I) in hexane (20% solids) was added to a 378 liter glass reactor equipped with a thermometer, stirrer, pressure means, inlet and outlet ports and maintained under a nitrogen atmosphere. To this reactor was then added with stirring 13.6 kilograms of the zinc methacrylate as prepared in Example 3 (20% total solids in hexane). After the addition was complete, the reaction mixture was stirred at ambient temperature for an additional 20 hours. The resulting solution masterbatch was then isolated by drum drying at 115° to 120° C. The masterbatch was analyzed by TGA and shown to contain 99 parts zinc methacrylate and 100 parts polymer (theoretical would be 100 parts zinc methacrylate and 100 parts polymer).

EXAMPLE NO. 6 AND 7

Finally, in order to demonstrate the effect of suspension masterbatching, according to the present invention, versus the conventional dry mixing technique, Examples 6 and 7 were prepared as follows:

Example 6 comprised 75 parts by weight of cis 1,4-polybutadiene and 45 parts by weight of a suspension comprising 20 parts by weight of zinc dimethacrylate and 25 parts by weight of cis 1,4-polybutadiene, to total 100 parts by weight of rubber for comparison with Example 7 which comprised 100 parts by weight of cis 1,4-polybutadiene and 20 parts by weight of zinc dimethacrylate powder, incorporated by conventional dry mixing. Both examples were vulcanized with 2.0 parts by weight of DiCup 40C at a temperature of 160° C. for 20 minutes. Physical properties were then measured and reported in Table II.

TABLE II

| Comparison of Compounded Physical Properties | | |
|---|---|---|
| | Invention Ex. 6 | Conventional Ex. 7 |
| % Rebound | 78 | 74 |
| Shore A Hardness | 80 | 80 |
| 20% Modulus, kg/cm$^2$ | 19.3 | 19.2 |
| Tensile strength, kg/cm$^2$ | 86 | 45 |
| % Elongation | 101 | 59 |

From the data in Table II, one can note that the rubber stock prepared according to the method of the present invention, Example 6, had improved tensile strength and elongation as well as increased rebound over the conventional method of Example 7. Visual inspection also evidenced a much improved dispersion for Example 6 than Example 7. Accordingly, the method of the present invention provides a much smaller particle size of the metal salt and eliminates separation thereof from the polymer, which results when conventional processing techniques are employed.

In conclusion, it should be clear from the foregoing examples and specification disclosure that the addition of metal salts of $\alpha,\beta$-ethylenically unsaturated carboxylic acids to rubbery polymers according to the method of the present invention improves the physical properties of the rubber compound as compared to rubber compounds to which these salts have been added conventionally. Moreover, it eliminates separate steps of solvent recovery that have been necessary heretofore. It is to be understood that the method is not limited to the zinc dimethacrylate and polybutadiene exemplified herein or by the disclosure of other metal salts and typical rubber polymers provided herein, the examples having been provided merely to demonstrate practice of the subject invention. Those skilled in the art may readily select other metal salts and/or rubbery polymers, according to the disclosure made hereinabove. Also, the preparation of the polymer cement, per se, is not a limitation of the present invention.

Thus, it is believed that any of the variables disclosed herein can readily be determined and controlled without departing from the scope of the invention herein disclosed and described. Moreover, the scope of the invention shall include all modifications and variations that fall within the scope of the attached claims.

We claim:

1. A method for incorporating metal salts of $\alpha,\beta$-ethylenically unsaturated carboxylic acids into polymers and improving the cured physical properties of vulcanizable rubber compositions based on such polymers comprising the steps of:

preparing a polymer cement in a suitable aliphatic hydrocarbon solvent;

forming a suspension of a metal salt of an $\alpha,\beta$-ethylenically unsaturated carboxylic acid in a hydrocarbon solvent miscible with said aliphatic hydrocarbon solvent; and mixing said polymer cement and said suspension together and thereafter removing said solvents to provide said metal salt uniformly dispersed within said polymer.

2. A method, as set forth in claim 1, wherein said step of preparing said polymer cement includes the step of polymerizing a vulcanizable rubber monomer selected from the group consisting of synthetic rubber monomers and blends thereof.

3. A method, as set forth in claim 2, wherein said step of forming includes the step of selecting a metal salt formed by the reaction of a metal selected from the group consisting of zinc, iron (II), copper (II) and the alkaline earth metals and an $\alpha,\beta$-ethylenically unsaturated carboxylic acid having from 3 to about 30 carbon atoms.

4. A method, as set forth in claim 3, wherein said step of preparing provides from about 98 to 2 parts by weight of said polymer for the vulcanizable rubber composition and said step of forming provides from about 2 to 98 parts by weight of said metal salt for the vulcanizable rubber composition, to total 100 parts by weight.

5. A vulcanizable polymer compound produced by the method of claim 4, wherein said polymer is cis 1,4-polybutadiene and said metal salt is zinc dimethacrylate.

6. A vulcanizable polymer compound produced by the method of claim 1.

* * * * *